United States Patent
Sandy, Jr.

[11] Patent Number: 5,226,737
[45] Date of Patent: Jul. 13, 1993

[54] TWO ROW ANGULAR CONTACT WHEEL BEARING WITH IMPROVED LOAD CAPACITY

[75] Inventor: William M. Sandy, Jr., Seven Hills, Ohio

[73] Assignee: General Motors Corporation, Detroit, Mich.

[21] Appl. No.: 887,970

[22] Filed: May 26, 1992

[51] Int. Cl.$^5$ .................................. F16C 19/08
[52] U.S. Cl. .................... 384/512; 384/513; 384/544
[58] Field of Search ............ 384/512, 513, 544, 510, 384/537, 569

[56] References Cited

U.S. PATENT DOCUMENTS

| | | |
|---|---|---|
| 2,712,482 | 7/1955 | Featonby . |
| 2,956,632 | 5/1959 | Forbush et al. .................... 180/73 |
| 3,937,535 | 2/1976 | Ladin ................................ 384/544 |
| 4,179,167 | 12/1979 | Lura et al. . |
| 4,835,829 | 6/1989 | Welschof et al. ................ 29/159.3 |
| 5,141,088 | 8/1992 | Kurihara ........................... 384/512 |

FOREIGN PATENT DOCUMENTS

| | | |
|---|---|---|
| 170017 | 6/1985 | European Pat. Off. . |
| 339720 | 4/1989 | European Pat. Off. . |

Primary Examiner—Lenard A. Footland
Attorney, Agent, or Firm—Patrick M. Griffin

[57] ABSTRACT

A two row, angular contact, separable race ring wheel bearing is given increased load capacity by maximizing the sizes of the two ball rows within the available annular envelope available between the inner spindle and outer hub. The two pathways for the outboard ball row, the first installed ball row, are ground right out to the radial limits of the envelope, allowing the diameter of the outboard ball row to be as large as possible, and larger than the inboard ball row. The larger diameter of the one ball row increases load capacity with no other significant change in the design of the bearing.

2 Claims, 1 Drawing Sheet ns in general, and specifically to a vehicle wheel bearing with
TWO ROW ANGULAR CONTACT WHEEL BEARING WITH IMPROVED LOAD CAPACITY This invention relates to vehicle wheel bearings in general, and specifically to a vehicle wheel bearing with maximized load capacity.

BACKGROUND OF THE INVENTION

Double row angular contact bearings have an inboard and an outboard row of axially spaced balls, each of which rides between diagonally opposed pathways formed on coaxial inner and outer races. In the context of a vehicle wheel bearing, the inner and outer races are generally referred to as the spindle and hub respectively. By diagonally opposed, it is meant that the pathways do not cover more that 90 degrees, and are located on opposed quadrants. More specifically, one row of balls rides between a pathway on the spindle that contacts their southwest quadrant and a pathway on the hub that contacts their northeast quadrant, while the other row of balls ride between a northwest quadrant pathway on the hub and a southeast quadrant pathway on the spindle.

It is possible to build such a bearing in which all four pathways are ground integral to the hub and spindle. In that case, the spindle and hub have to be manipulated through some fairly complex relative positions in order to install both rows of balls between them, and there is a limit as to how many balls can be inserted into each row. Such bearings are typically called Conrad assembled, or less than full complement, in reference to the limited number of balls possible. The less than full complement of balls also limits the load capacity of the bearing. Because of the limited load capacity of Conrad assembled bearings, a more common approach is to have only three of the four pathways integrally ground to the hub and spindle. Typically, two pathways, one for each ball row, are integrally ground into the hub, and one pathway is ground into the spindle. The remaining pathway is ground onto a separate structure, often called a separable race ring, which is installed and attached to the spindle last, after the last ball row has been installed. This allows a full complement of balls to be installed into each row, because the separable race ring is out of the way when the last ball row is being installed.

While the load capacity of a separable race ring bearing is not limited the number of balls, it is, as is true for any ball bearing, limited by the diameter of the balls. That is, larger diameter balls, if they could be fitted between the spindle and hub, would provide more load capacity. There are limitations on the ball space available between the hub and spindle, however. The spindle and hub can only be so large overall in order to accommodate and clear the wheels, braking, and suspension system of the automobile. They also have to have a certain minimum radial thickness in order to take the loads they must support. The separable race ring itself has a certain minimum radial thickness, so the space available between it and the integrally ground hub pathway that it faces is even more limited. Generally, the inboard and outboard ball rows of separable race ring wheel bearings are of the same diameter. For an example, see U.S. Pat. No. 4,179,167 to Lura et al, assigned to the assignee of the current invention. If a way could be found to enlarge the diameter of even one of the ball rows, without otherwise increasing the size of or weakening the hub or spindle, load capacity would be improved.

SUMMARY OF THE INVENTION

The invention provides a separable race ring wheel bearing with improved capacity. As noted above, there is limited ball space between hub and spindle, which can be defined as an annular support envelope. The bearing of the invention first makes maximum use of this support envelope to improve load capacity.

In the disclosed embodiment, the integrally ground pathways for the outboard ball row are ground right at the limits of the envelope, allowing for the maximum possible diameter for the outboard ball row. The separable race ring has an inevitable thickness between its pathway and its cylindrical installation surface, which is press fit over the spindle. It cannot, therefore, have its pathway right at the inner limit of the available support envelope. Instead, the installation surface is designed to be at the inner limit of the envelope, which does maximize the space available between its pathway and the integral hub pathway that it faces, maximizing the size of the inboard ball row. However, the inboard ball row is thereby made smaller than the outboard ball row, unlike a conventional bearing. While this necessitates the use of two different sizes of ball, everything else about the manufacture and assembly of the bearing is basically the same. A significant increase in load capacity is achieved for a very small increase in cost.

It is, therefore, a general object of the invention to increase the load capacity of a separable race ring type wheel bearing.

It is another object of the invention to provide such an increase in load capacity with no change in the basic size or componentry of the bearing.

It is another object of the invention to provide such a bearing in which the support envelope available for the ball rows is identified, and in which the diameters of the ball rows, and consequent load capacity, are maximized within that identified envelope.

DESCRIPTION OF THE PREFERRED EMBODIMENT

These and other objects and features of the invention will appear from the following written description, and from the drawings, in which.

Figure 1:
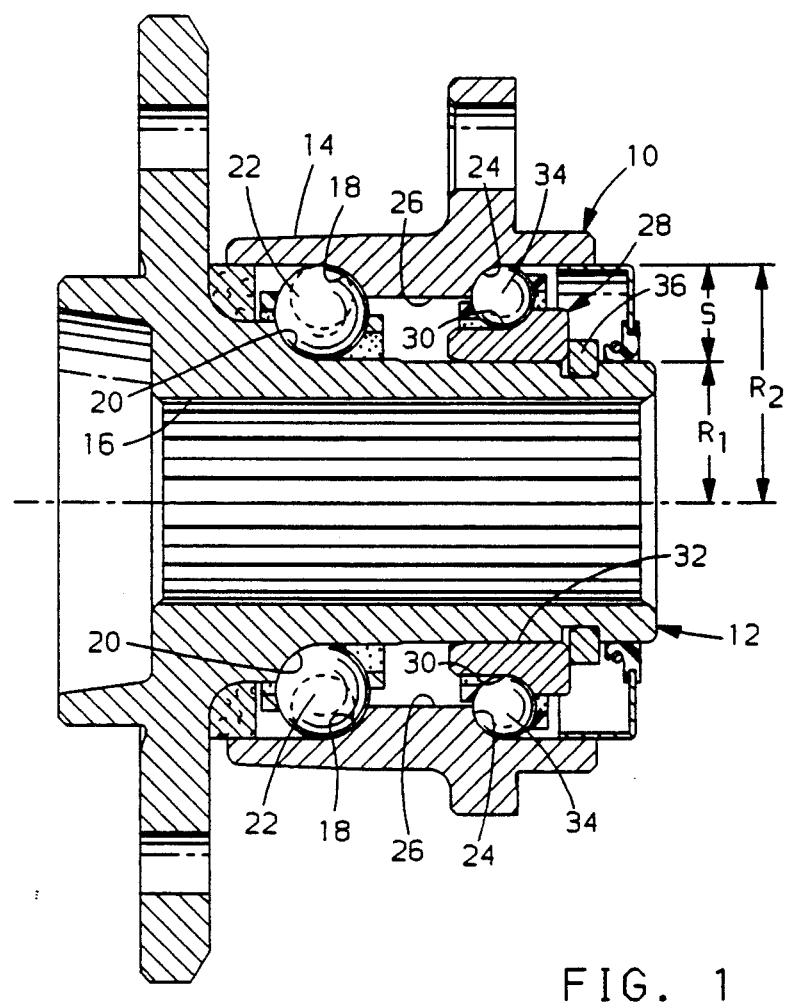
FIG. 1 is a cross section of a fully assembled bearing according to the invention, showing the ball rows in elevation.

Referring to FIG. 1, a preferred embodiment of the angular contact, two row wheel bearing of the invention includes two main components, a cylindrical outer hub, indicated generally at (10), which coaxially surrounds a central spindle, indicated generally at (12). Hub (10) would be bolted to a vehicle suspension not illustrated, so the basic dimensions of its outer surface (14) are already determined, and not alterable by a designer seeking to increase capacity. Likewise, spindle (12) would be bolted to a standard driven wheel and a standard drive shaft would be inserted down its central tunnel (16), so its inner dimensions are already determined and inalterable. Another design limitation is the radial thickness of hub (10) and spindle (12), which cannot be less than a certain minimum in order to handle the radial loads expected in operation. Another way to express this limitation, though one apparently not generally used in the art, is to denote a minimum outer radius $R_1$ for spindle (12), and a maximum inner radius $R_2$ for hub (10), measured from the central axis to the radially thinnest sections of each. The differential between $R_1$ and $R_2$, indicated at S, can be said to define and limit the size of an annular space between hub (10) and spindle (12), which may be termed an available support envelope. This is the largest envelope available within which bearing balls, which support the load, may be contained.

Figure 2:
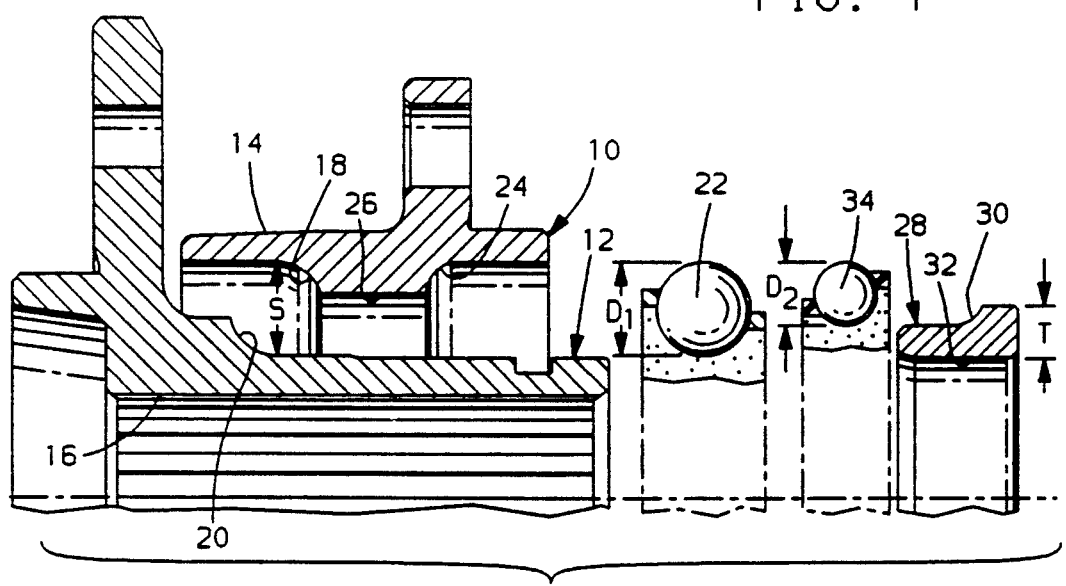
FIG. 2 is a disassembled view of the same bearing.

Referring to FIG. 2, what the invention does, in general, is to recognize and define this particular design limitation, and then work within it to maximize load capacity. Specifically, two outboard angular contact pathways are ground on one side, the outboard side in this case, an outer pathway (18) in hub (10) and a diagonally opposed inner pathway (20) on spindle (12). Being angular contact pathways of the type described above, the outboard pathways (18) and (20) are defined on opposed, northeast and southwest quadrants respectively, and do not cover more than 90 degrees. As such, the pathways (18) and (20) merge smoothly into cylindrical surfaces, (or into horizontal lines as seen in cross section) and do not wrap back or change slope thereafter. Each outboard pathway (18) and (20), unlike the conventional case, is deliberately ground right out to outer and inner limits of the support envelope respectively, leaving a space between them that is maximized, that is, which is substantially equal to S. Consequently, there is room between the opposed outboard pathways (18) and (20) to take a row of balls (22) with a diameter $D_1$ that is also substantially equal to S. Conventionally, the outboard balls would be of smaller diameter than $D_1$, and consequently of lower; load capacity, as seen in the patent referred to above. The outboard pathways (18) and (20) are therefore a)so larger in curvature, which distinguishes them from other pathways described below.

Still referring to FIG. 2, a third angular contact pathway, an outer inboard pathway (24), is integrally ground into hub (10) at a point axially separated from outboard pathway (18). Inboard pathway (24) is defined on a northwest quadrant, and is also ground right out to the outer limit of the envelope, so that each pathway (18) and (24) on hub (10) merges into the same cylindrical surface (lying on the same horizontal line, as seen in cross section). However, the inboard pathway (24) has a tighter, smaller curvature than the other pathway (18) on hub (10). Because of the way the pathways (18) and (24) are integrally ground to hub (10), there is a thickened annular shoulder (26) left between them, which dictates how the outboard ball row (22) is installed, as described below. Unlike the outboard pathway (18) on hub (10), inboard pathway (24) does not face a matched integrally ground pathway on spindle (12). Instead, a separable race ring, indicated generally at (28), is ground with an opposable inboard pathway (30) with a curvature equal to pathway (24), and a cylindrical installation surface (32) located on a radius substantially equal to $R_1$. Separable race ring (28) is ground of a material similar to spindle (12), and has a certain minimum thickness T, which is necessary for the structural integrity of the part. As a consequence, the space potentially available between the inboard pathways (24) and (30) is significantly less than S, and the diameter $D_2$ of the the inboard row of balls (34) that can run between them is significantly less that $D_1$. However, this diminution in ball size is necessitated by the general geometry of the hub (10), spindle (12), and by the way they are assembled, described below.

Comparing FIGS. 2 and 1, the general method by which the hub (10) and spindle (12) are assembled may be seen. First, the outboard ball row (22) is installed against the outboard pathway (20) of spindle (12), alone. Hub (10) cannot be aligned with spindle (12) at this point, because shoulder (26) would then block the insertion of the outboard balls (22). A full complement of outboard balls (22) is possible, however, because there is nothing in the way to block them or limit their number. After the outboard balls (22) are in place, hub (10) is then moved to the FIG. 2 position, coaxially over spindle (12), which serves to abut the outboard balls (22) with the other outboard pathway (18). Now, with the separable race ring (28) still removed, the inboard row of balls (34) is placed against the integral inboard pathway (24). A full complement of the inboard ball row (34) is possible here, as well, because no blocking structure exists to limit their number. Finally, separable race ring (28) is installed by press fitting its installation surface (32) tightly over spindle (12), which brings the other inboard pathway (30) up against inboard ball row (34). Finally, race ring (28) is fixed in place by a keeper ring (36) to create and maintain the desired preload and axial end play. Because of the thickness T of race ring (28), as noted above, the inboard balls (34) are smaller than the outboard balls (22). However, by putting the race installation surface (32) at the inner envelope limit $R_1$, $D_2$ is at least maximized. More to the point, the outboard ball row (22) is bigger than it would be if it were simply chosen to be the same size as the inboard row (34), as is typical. The difference in size is indicated by the superimposed dotted circles in FIG. 1, which indicate the location of a same size ball for comparison.

In conclusion, no potential load capacity is wasted, since the size of the outboard ball row (22) is maximized within the available support envelope. Two different ball sizes would have to be carried in inventory, but the basic build and assembly of the hub (10) and spindle (12) would be little changed, apart from grinding the outboard pathways (18) and (20) to a larger curvature. Hub (10) would be changed the least, since its two pathways (18) and (24) would still be in basically the same location, though pathway (18) would have a larger curvature, to accommodate the larger ball (22). Spindle (12) would be changed the most quantitatively, since more metal would be ground away in the process of grinding the larger curvature pathway (20), but its basic process of manufacture would be the same. The balls (22) and (34) do not run on the same pitch circle, as they would if they were the same diameter, but that would not make a significant difference in operation. However, the designer could now shift loads more toward the larger outboard ball row (22), which would give more design flexibility and allow the wheel and suspension attachment locations to be brought axially closer, if desired.

Variations in the preferred embodiment could be made. For example, either the hub (10) or spindle (12) could be the rotating, wheel carrying member. For example, if the wheel were nonpowered and attached to the hub (10), then the spindle (12) would not have to receive a drive shaft through its center, and so could be solid. In the event that the outer hub carried the wheel, and not the spindle, then the race ring (28) could be on the other side, carrying a pathway for the outboard ball row, not the inboard row, and the inboard ball row would be the larger diameter row. If the diagonal opposition of the two sets of pathways were reversed in terms of the quadrants that they were located in, an externally divergent design as opposed to the externally convergent design shown, then the separable race ring (28) could be made to install inside the hub (10), rather than over the spindle (12). Therefore, it will be understood that it is not intended to limit the invention to just the embodiment disclosed.

The embodiments of the invention in which an exclusive property or privilege is claimed are defined as follows:

1. In an angular contact two row ball bearing having an outer hub with a predetermined inner radius and a coaxial inner spindle with a predetermined outer radius defining the inner and outer radial limits of an annular support envelope therebetween equal in size to the difference between said outer and inner radii, the improvement comprising,
   a pair of diagonally opposed, large curvature angular contact pathways integral to said hub and spindle and located on one side of said hub and spindle near the respective radial limits of said support envelope,
   a first row of balls riding between said large curvature pathways with a diameter substantially equal to the size of said envelope,
   one of said hub and spindle further including a first small curvature angular contact pathway located on the other side of said hub and spindle near one radial limit of said envelope,
   a separable race ring of predetermined thickness having an installation surface fitted to the other of said hub and spindle and located at the other limit of said envelope and a second small curvature angular contact pathway opposed to said first small curvature pathway, and,
   a second row of balls of smaller diameter riding between said small curvature pathways.

2. In an angular contact two row ball bearing having an outer hub with a predetermined inner radius and a coaxial inner spindle with a predetermined outer radius defining the inner and outer radial limits of an annular support envelope therebetween equal in size to the difference between said outer and inner radii, the improvement comprising,
   a pair of diagonally opposed, angular contact outboard pathways integral to said hub and located near the respective radial limits of said support envelope,
   an outboard row of balls riding between said outboard pathways with a diameter substantially equal to the size of said envelope,
   said hub further including a first angular contact inboard pathway located near the outer radial limit of said envelope,
   a separable race ring of predetermined thickness having an installation surface fitted to said spindle and located at the inner limit of said envelope and a second angular contact inboard pathway opposed to said first inboard pathway, and,
   an inboard row of balls of smaller diameter riding between said inboard pathways.

* * * * *